July 23, 1968 C. E. ENDERBY ET AL 3,393,954
OPTICAL MODULATOR
Filed Dec. 16, 1963 3 Sheets-Sheet 1
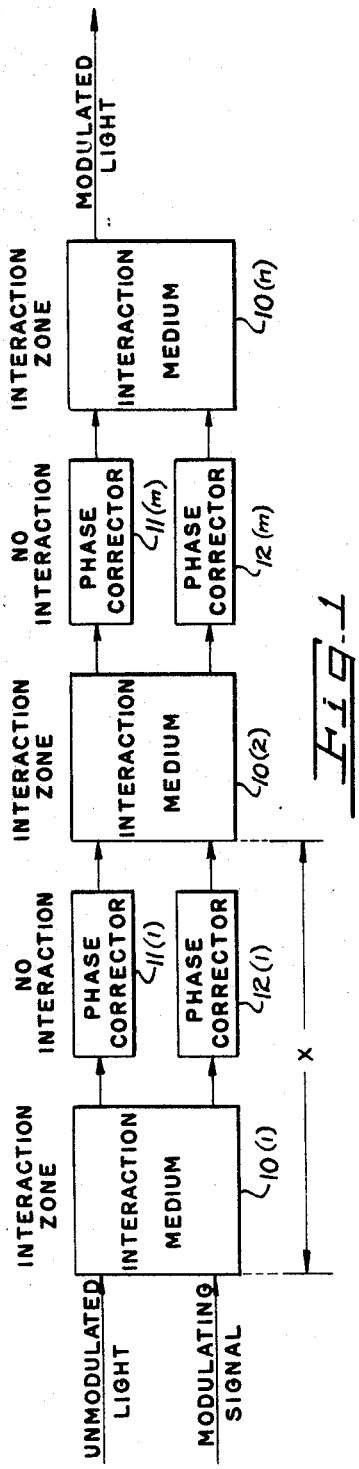
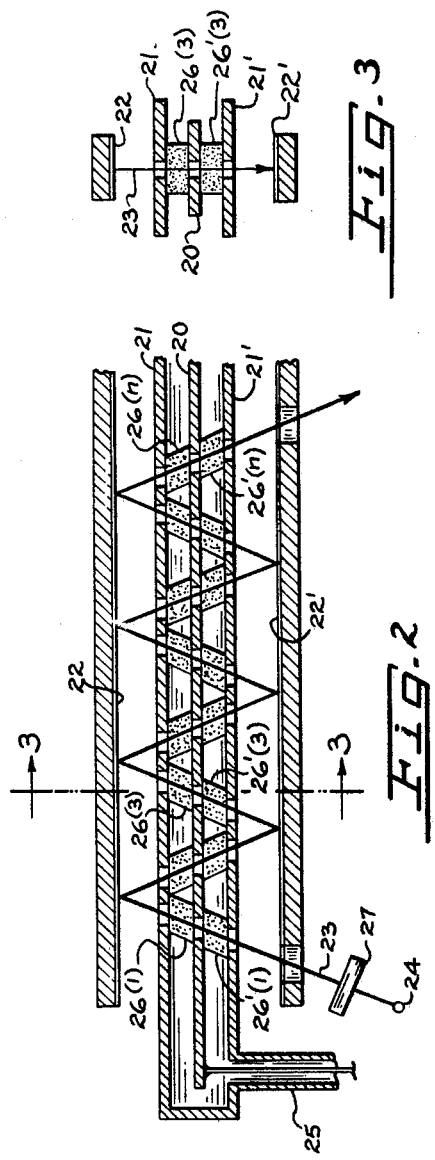
INVENTORS
RICHARD M. WHITE
CHARLES E. ENDERBY
BY
*Samuel E. Turner*
ATTORNEY

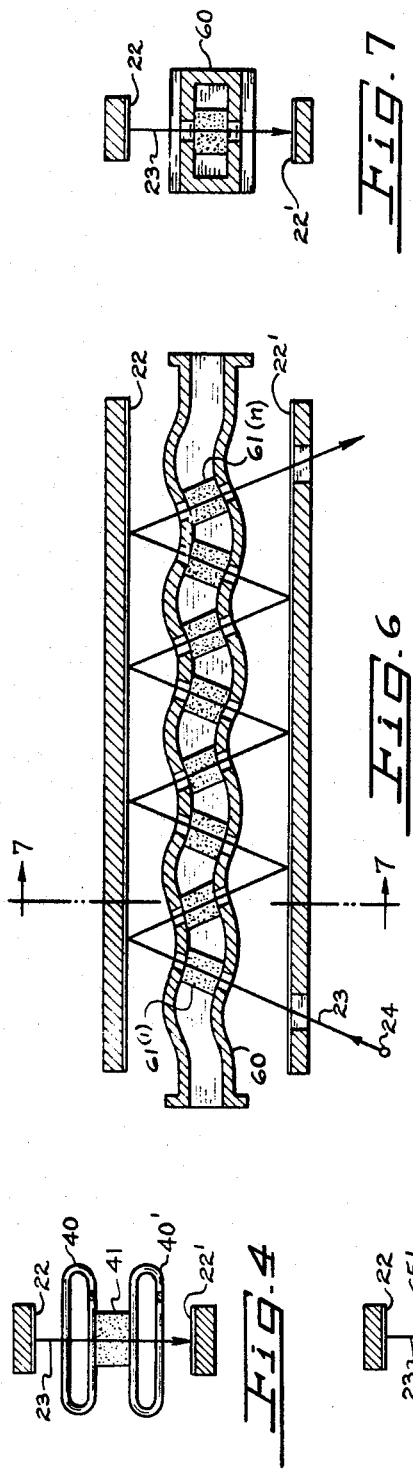

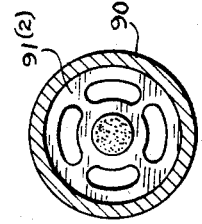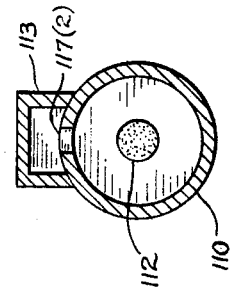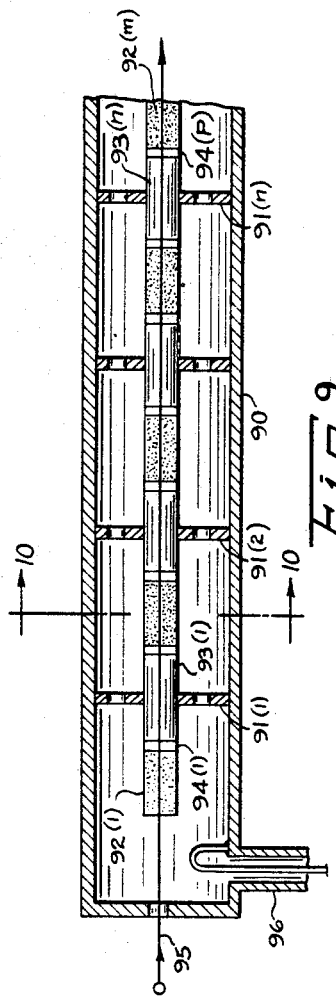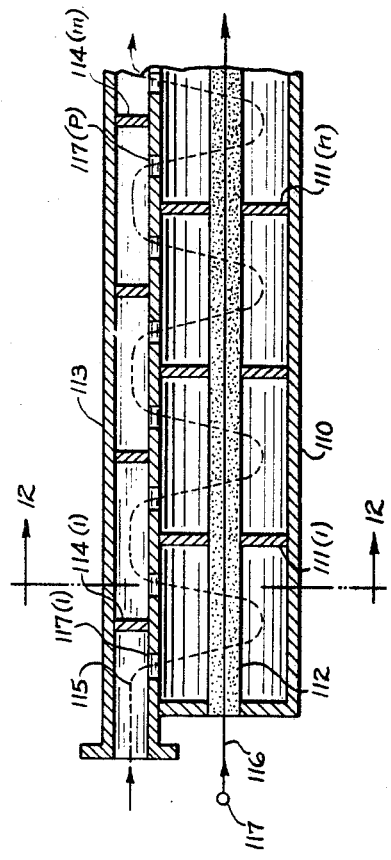

United States Patent Office 3,393,954
Patented July 23, 1968

1

3,393,954
OPTICAL MODULATOR
Charles E. Enderby, Palo Alto, and Richard M. White, Berkeley, Calif., assignors to General Electric Company, a corporation of New York
Filed Dec. 16, 1963, Ser. No. 330,686
15 Claims. (Cl. 350—150)

ABSTRACT OF THE DISCLOSURE

A system for modulating a light beam with microwave energy comprising: a structure for propagating said light beam and said microwave energy at different phase velocities, said structure including electro-optic material arranged along said structure to provide a series of spaced interaction zones, said structure propagating said light beam through the electro-optic material of each of said zones in succession, said structure propagating said microwave energy such that said energy is applied to the electro-optic material only at each of said zones in succession, said structure providing substantially equal transit times for said light beam and said microwave energy between the beginning of each of said zones and the beginning of the next successive zones for providing synchronous intermittent modulation of said light beam by said microwave energy.

---

The invention relates to modulation of a light beam by electromagnetic energy. More particularly the invention relates to wideband optical modulation by synchronous intermittent interaction of a light beam with a microwave modulating signal in an interaction medium.

There are a number of optical materials the light propagating properties of which are altered by the application of an electric field (the electro-optic effect) or a magnetic field (the magneto-optic effect). Such materials may be employed as an interaction medium to provide modulation of a light beam by electromagnetic energy. For example, the electric field of a microwave modulating signal can be applied to an electro-optic medium to provide an electric-field-controlled change in the polarization of a light beam which is passed through the medium.

A principal problem in devices of this type is the provision of cumulative synchronous interaction between the light beam and the microwave modulating signal because of the difference in phase velocities in the interaction medium. For example, in an electro-optic medium such as KDP (crystalline potassium dihydrogen phosphate) microwaves travel at a velocity of about 1/4.47 times that of light in a vacuum whereas a light beam therein travels at a velocity of about 1/1.47 times that of light in a vacuum.

Thus the light waves and the modulating signal will in general be in phase only over a relatively short length of interaction medium. Therefore to provide high percentage modulation over a broad band of modulating signal frequencies in a short length of interaction material a modulating signal of high power is required.

Alternatively the velocities of propagation of the light beam and the modulating signal in an interaction medium can be approximately equalized over a relatively narrow frequency range of the modulating signal whereby substantially synchronous interaction can be achieved in an interaction medium of longer length with a consequent decrease in the required modulating signal power. Such an arrangement is shown, for example, by Kaminow in

2 article entitled "Microwave Modulation of the Electro-Optic Effect in $KH_2PO_4$," Physical Review Letters, May 1961, pp. 528–530. In the Kaminow device the light to be modulated is propagated through a KDP rod in a cylindrical cavity. The dimensions of the cavity and mode of excitation were selected so that microwave phase velocity and the light velocity are approximately equal, the bandwidth being limited by the cavity Q to a relatively narrow frequency range.

It is, however, desirable to provide electromagnetic wave modulation of a light beam over a broad band of microwave frequencies with relatively low electromagnetic wave power.

It is therefore a primary object of the invention to modulate a light beam with a modulating signal of relatively low power over a relatively broad band of modulating signal frequencies.

It is a more specific object of the invention to provide synchronous intermittent interaction between a light beam and a modulating signal.

These and other objects of the invention are achieved by a structure comprising a series of successive interaction zones containing interaction material and providing propagation of the light beam and the modulating signal such that the transit time of propagation from the beginning of one interaction zone to the beginning of the next successive interaction zone is substantially the same for both the light waves and the modulating signal. Therefore at each interaction zone the field of the modulating signal applied to the interaction medium is substantially in phase with the modulation which has been impressed on the light beam at previous interaction zones. In this manner cumulative modulation is achieved.

According to a first embodiment of the invention, a structure is provided for propagating the modulating signal along a first path containing interaction material at successive spaced interaction zones. The light beam is propagated along a second longer path whereby it passes through the interaction medium at each interaction zone in succession. By the provision of a longer path for the higher velocity light beam, the transit time between entries into successive interaction zones is made substantially the same for both the light waves and modulating signal to thus provide the desired synchronous interaction. Thus according to the first embodiment of the invention, synchronous intermittent interaction is achieved by providing a longer path for the light beam between interaction zones.

According to a second embodiment of the invention a structure for propagating the light beam to be modulated is positioned within a wave transmission structure for propagating the modulating signal. The light propagation structure comprises a series of spaced interaction members which thus form a succession of interaction zones. Positioned between each pair of interaction members is an optical medium having a relatively high index of refraction for the propagating light waves whereby the velocity of the light is decreased between the interaction zones formed by the interaction members. By thus decreasing the velocity of the propagating light between the interaction zones, phase synchronism of the light beam and the modulating signal at the interaction zones is substantially maintained. Thus, according to the second embodiment of the invention, synchronous intermittent interaction is provided by decreasing the velocity of the light beam between interaction zones.

According to a third embodiment of the invention, a wave transmission structure is provided for propagating the modulating signal alternately through separated interaction zones and intervening fast-wave circuits. The light beam to be modulated is propagated through interaction material positioned in the interaction zones. Thus according to the third embodiment of the invention, synchronous intermittent interaction is achieved by fast-wave propagation of the modulating signal between interaction zones over a longer path than the path traversed by the light beam through the interaction medium.

The invention is described more specifically hereinafter with reference to the accompanying drawings wherein:

FIGURE 1 is a schematic illustration of the general structure of the modulator of the invention;

FIGURE 2 is a longitudinal section view, an example of the first embodiment of the invention;

FIGURE 3 is a transverse section view of the structure of FIG. 2;

FIGURE 4 is a transverse section view illustrating the employment of a pair of flattened helices in the first embodiment of the invention;

FIGURE 5 is a transverse section view illustrating the employment of a parallel ladder wave propagation circuit in the first embodiment of the invention;

FIGURE 6 is a longitudinal section view of an example according to the first embodiment of the invention which employs a sinuous waveguide;

FIGURE 7 is a transverse section view of the structure of FIG. 6;

FIGURE 8 is a perspective view of another version of the first embodiment of the invention;

FIGURE 9 is a longitudinal partial section view of an example of a second embodiment of the invention;

FIGURE 10 is a transverse section view of the structure of FIG. 9;

FIGURE 11 is a longitudinal section view of an example of a third embodiment of the invention; and FIGURE 12 is a transverse section view of the structure of FIG. 11.

The general principle of the synchronous intermittent interaction modulator structure of the invention is illustrated schematically in FIG. 1.

A series of interaction members $10(l)-10(n)$ form a series of successive interaction zones. The light to be modulated by the modulating signal is passed through the interaction medium of each of the interaction zones in succession. The modulating signal is applied to the interaction medium of each of the interaction zones in series whereby the appropriate field of the modulation signal causes modulation of the light beam.

To provide cumulative modulation of the light beam, it is required that the phase of the modulating signal, acting on the interaction medium, be the same, at each interaction zone, as the phase of modulation which has been impressed on the light beam at previous interaction zones.

In general, the phase velocities of the light waves and the modulating signal waves are different in their propagation through the interaction medium of the interaction zones. It is therefore a feature of the invention that phase correction means are provided between the interaction zones so that the transit times of the light waves and the modulating signal waves are the same from the beginning of one interaction zone to the beginning of the next interaction zone (for example, over the distance X in FIG. 1) whereby the required phase relationship for cumulative interaction can be substantially maintained over a wide frequency range of the modulating signal.

The phase correction means are illustrated generally in FIG. 1 as a series of phase correctors $11(l)-11(m)$ in the interzonal paths of the light beam and a series of phase correctors $12(l)-12(m)$ in the interzonal paths of the modulating signal. While phase (or transit time) correction of both the light beam and the modulating signal is shown in FIG. 1 to illustrate the general principle of the invention, it is to be appreciated that in a specific embodiment the interzonal transit time correction of only one, the light or the modulating signal, is usually sufficient.

The phase correctors may take several forms for providing the required transit time equalization, for example, the phase correctors may provide different path lengths, or different interzonal velocities, or both.

Thus the present invention is based on the principle of intermittent interaction with transit time equalization between interaction zones to provide the phase synchronism required for cumulative modulation, as will be more apparent from the following descriptions of examples of specific embodiments of the invention.

As mentioned hereinbefore, according to a first embodiment of the invention synchronous intermittent interaction is achieved by causing the light waves to travel a longer path through the modulator structure than that traveled by the slower propagating modulating signal. This first embodiment of the invention may take a variety of specific forms, examples of which are illustrated by FIGS. 2–8.

The longitudinal section view of FIG. 2 and the transverse section view of FIG. 3 illustrate an example of the first embodiment of the invention wherein the modulating signal is propagated by a shielded strip line and the light beam is caused to travel a longer zig-zag course.

The modulating signal propagation structure of FIGS. 2 and 3 comprises a well-known strip line 20 positioned between a pair of shield strips 21 and 21'. Modulating signal input is by way of a coaxial line 25, the center conductor of which is connected to the strip line 20 and the outer conductor of which is connected to the shield strips.

The light beam propagation structure comprises a pair of reflecting members 22 and 22' between which a light beam 23 from a light source 24 is repeatedly reflected whereby the light beam periodically traverses the modulating signal propagating structure.

A series of interaction members $26(l)-26(n)$ and $26'(l)-26'(n)$, formed of an interaction material such as KDP, are sandwiched between the strip line 20 and the shield strips 21 and 21' in the regions along the modulating signal propagating structure which are traversed by the light beam to thus form a series of successive interaction zones. The interaction material is positioned so that the optical axis thereof is substantially parallel to the light beam. It is noted that the strip line 20 and the shield strips 21 and 21' are gridded or slotted as is appropriate to allow passage of the light beam.

While separate spaced interaction members are illustrated, as an alternative construction the spaces between the strip line 20 and the shield strips 21 and 21' can be entirely filled with interaction material. Also, to reduce light reflection losses at the faces of the interaction members, a material having a refractive index substantially equal to that of the interaction medium may be placed between the faces of the interaction members and the reflecting members 22 and 22'.

The angle of reflection of the light beam and the spacing of the reflecting members 22 and 22' are selected to provide the required transit time equalization of the modulating signal and the light waves between the beginning of each intersection zone and the beginning of the following interaction zone as previously discussed.

For many applications of the present modulator structure it is desirable that the input light beam be polarized. If the light source employed does not furnish polarized light, the light beam may be passed through a well-known polarizer, illustrated as a polarizer 27 in FIG. 2, for this purpose.

The mode of propagation of the microwave modulating signal will depend upon the type of modulation desired, upon the kind of interaction material employed and upon the orientation of the interaction material in the case of a crystalline interaction medium. For example, the modulating signal may be propagated in a mode to provide a component of its electric field parallel to the light beam in an electro-optic medium such as KDP and the KDP material may be oriented to provide polarization modulation of the light beam. Phase modulation of the light beam may be provided by a similar orientation of the KDP material and the propagation of the modulating signal in a mode which provides a component of its electric field transverse of the light beam.

For a listing of various materials which exhibit the electro-optic and magneto-optic effects reference is made to the American Institute of Physics Handbook, McGraw-Hill Book Co., New York, 1957, pp. 6–91 to 6–97.

While a strip line microwave propagation structure is illustrated in FIGS. 2 and 3, other propagation structures can be employed; for example, various types of slow wave structures can be used with the advantage that the energy density at the interaction zones is increased by the slowing of the waves. FIG. 4 is a transverse section view of a modulator structure employing a pair of flattened helices 40 and 40' between which a large electric field exists in an interaction medium 41. The light beam 23 periodically traverses the helical propagating structure in its zig-zag path between reflecting members 22 and 22'.

FIG. 5 is a transverse section view of a modulator structure employing a parallel ladder microwave propagating structure 50 between the ladder members of which is positioned an interaction medium 51. The slots in the ladder structure provide the necessary openings for passage of the light beam 23.

Another version of the first embodiment of the invention is illustrated in FIGS. 6 and 7. In this version the microwave transmission structure comprises a section of rectangular waveguide 60 which has a sinuous form across the narrow dimension thereof. The waveguide 60 contains a series of interaction members $61(l)-61(n)$ which form a succession of interaction zones at points of traversal of the light beam 23. Appropriate slots are provided in the waveguide to allow passage of the light beam. The advantage of this arrangement is that the light beam passes through the interaction medium of the interaction zones in a direction perpendicular to the axis of the waveguide. Thus the modulating signal can be propagated in a mode such that the desired field thereof is parallel to the light beam (and to the optical axis of the interaction material) at the interaction zones.

Shown in the partly cut away perspective view of FIG. 8 is a further version of the first embodiment of the invention which also provides passage of the light beam parallel to the axis of the modulating signal propagation structure.

The modulating signal propagation structure of FIG. 8 comprises an H-guide formed of a pair of conducting side plates 80 and 80' separated by a dielectric ridge 81. The modulating signal is applied by way of an input waveguide section 82, the side plates 80 and 80' of the H-guide being continuations of the broad walls of the input waveguide section.

The spaced interaction zones are formed by a series of interaction members $83(l)-83(m)$ which are formed of an interaction material and are placed in a series of spaced apertures in the dielectric ridge 81 at points along the structure traversed by the light beam.

The light beam propagation structure of FIG. 8 comprises a series of prisms $84(l)-84(n)$ alternate ones of which are positioned along opposite sides of the H-guide to direct the light beam from a light source 85 along a path illustrated by the dashed line, the spacing of the prisms being selected, in relation to the spacing of the interaction zones and the phase velocity of the modulating signal, to provide the path length of light required for zone-to-zone transit time equalization of the light waves and modulating signal. The side plates 80 and 80' are, of course, appropriately apertured to allow passage of the light beam.

Thus according to the first embodiment of the invention, as illustrated by examples of FIGS. 2–8 discussed above, the zone-to-zone transit time equalization for maintaining phase synchronism of the light waves and modulating signal is achieved by providing a lengthened path for the light beam.

An example of the second embodiment of the invention is illustrated in FIGS. 9 and 10. In this embodiment of the invention transit time equalization is achieved by decreasing the phase velocity of the light waves between the interaction zones.

In the modulator structure of FIGS. 9 and 10 the modulating signal propagation structure comprises a disc-loaded section of a waveguide 90 loaded by a series of apertured discs $91(l)-91(n)$. (Such loaded waveguide structures are discussed, for example by A.H.W. Beck in Space Charge Waves, Pergamon Press, New York, 1958.) The modulating signal is applied to the loaded waveguide 90, for example, via a coaxial input line 96.

A structure for propagating a light beam 95, which is to be modulated, is positioned coaxially in the waveguide 90. The light beam propagating structure comprises a series of spaced interaction members $92(l)-92(m)$ which may be formed, for example, of electro-optic material such as KDP.

Positioned between each pair of interaction members is a light wave slow-wave medium, illustrated in FIG. 9 as a series of optical members $93(l)-93(n)$. The optical slow-wave members may be formed of any suitable optically transparent dielectric material which has a relative dielectric constant of greater than unity, the length of the optical members $93(l)-93(n)$ and dielectric constant thereof being selected to provide the required decrease in phase velocity of the light between the interaction members.

To improve the transition between the interaction members and the optical slow-wave members a quarter-wave matching segment may be positioned therebetween as illustrated by a series of matching segments $94(l)-94(p)$. These matching segments are formed with a thickness corresponding to a quarter wavelength of the light wave at its velocity in the matching segment material and the material may be any suitable optically transparent dielectric material having a dielectric constant to provide a phase velocity in the segment which is the geometric mean of the phase velocities of the light waves in the interaction medium and slow-wave medium.

Thus in the example of the second embodiment of the invention illustrated in FIGS. 9 and 10, optical slow-wave members are provided between interaction zones to decrease the velocity of the light waves therebetween for maintaining synchronism with the modulating signal at the interaction zones.

An example of the third embodiment of the invention is illustrated in FIGS. 11 and 12. In this embodiment of the invention transit time equalization is achieved by propagating the light beam in the interaction medium (wherein its velocity is less than the velocity of light in a vacuum) and by propagation of the modulating signal along a longer path between interaction zones and at a greater velocity than the velocity of the light beam in the interaction medium.

The modulator structure of FIGS. 11 and 12 comprises an elongated channel 110 which is divided into a series of interaction chambers or zones by a series of partitions $111(l)-111(n)$. Positioned within the channel 110 (preferably coaxially therewith) and extending through the series of partitions is an elongated member 112 formed of an interaction material; for example, the member 112 may be a rod of KDP. The light to be modulated, shown as a light beam 116 from a light source 117, propagates through the member 112 at a velocity dependent on the characteristic of the material, for example, in KDP at a velocity of about 1/1.47 times the velocity of light in a vacuum.

The modulating signal propagation structure of FIGS. 11 and 12 comprises a compartmentized waveguide 113, the compartments of which are formed by a series of partitions 114($l$)–114($m$). As illustrated in FIGS. 11 and 12, one wall of the waveguide 113 is common to the channel 110. Formed in this common wall is a series of apertures 117($l$)–117($p$) to provide coupling between the compartments of the waveguide 113 and the interaction chambers whereby the modulating signal is intermittently applied to the interaction member 112. The modulating signal thus follows a path as illustrated generally by a dashed line 115. The longer path of travel of the modulating signal provides compensation for its greater average velocity relative to the velocity of the light waves through the interaction member 112 whereby phase synchronism is maintained.

Thus what has been described is a light modulation structure providing intermittent interaction with phase correction between interaction zones whereby cumulative modulation of a light beam is achievable over a wide range of modulating signal frequencies with relatively lower modulating signal power.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. A system for modulating a light beam with microwave energy comprising: a structure for propagating said light beam and said microwave energy at different phase velocities, said structure including electro-optic material arranged along said structure to provide a series of discrete, spaced interaction zones, said structure propagating said light beam through the electrooptic material of each of said zones in succession, said structure propagating said microwave energy such that said energy is applied to the electro-optic material only at each of said zones in succession, said structure providing substantially equal transit times for said light beam and said microwave energy between the beginning of each of said zones and the beginning of the next successive zones for providing synchronous intermittent modulation of said light beam by said microwave energy.

2. A modulator structure for modulating a beam of light waves with an electromagnetic modulating signal comprising: means forming a series of discrete, spaced interaction zones, each of said zones containing an interaction medium having a light propagation characteristic which changes as a function of electromagnetic energy applied thereto; means for propagating said light waves through said medium at each of said zones in succession; means for applying said electromagnetic signal to said medium at each of said zones in series; and phase correction means operable to substantially equalize the transit times of said light waves and said modulating signal between the beginning of each interaction zone and the beginning of the next successive interaction zone.

3. The modulator structure defined by claim 2 wherein said phase correction means comprises means providing a longer path for said light waves than for said modulating signal between said interaction zones.

4. The modulator structure defined by claim 2 wherein said phase correction means comprises means for propagating said modulating signal between said interaction zones at a greater velocity than the velocity of said light waves between said interaction zones.

5. A modulator structure for modulating a beam of light waves with an electromagnetic modulating signal, comprising: a light wave propagating structure comprising a series of discrete, spaced interaction members formed of an interaction material the light propagation characteristics of which are alterable in response to electromagnetic energy applied thereto; a series of light wave slow-wave members, each slow-wave member being positioned between an adjacent pair of said interaction members, said slow-wave members having the characteristic of decreasing the velocity of said light waves relative to the velocity of said light waves in said interaction material; and means for applying electromagnetic wave energy to said interaction members.

6. A modulator structure for modulating a light beam with an electromagnetic signal, comprising: a wave transmission structure for propagating said electromagnetic signal along a predetermined axis thereof, said wave transmission structure including electromagnetic energy responsive interaction material arranged along said axis to provide a series of discrete, interaction zones whereby said electromagnetic signal is applied to said interaction material at said interacton zones; and means for directing said light beam so that said light beam successively traverses said wave transmission structure through successive interaction zones.

7. The modulator structure defined by claim 6 wherein said wave transmission structure comprises a strip line.

8. The modulator structure defined by claim 6 wherein said wave transmission structure comprises a pair of spaced helices.

9. The modulator structure defined by claim 6 wherein said wave transmission structure comprises a parallel ladder circuit.

10. The modulator structure defined by claim 6 wherein said wave transmission structure comprises an H-guide.

11. The modulator structure defined by claim 6 wherein said light beam successively traverses said wave transmission structure in a direction substantially perpendicular to said axis of said wave transmission structure.

12. The modulator structure defined by claim 11 wherein the axis of said wave transmission structure defines a sinuous path.

13. The modulator structure defined by claim 11 wherein said means for directing said light beam comprises a series of prisms, alternate ones of said prisms being positioned along opposite sides of said wave transmission structure.

14. A modulator structure for modulating a beam of light waves with an electromagnetic modulating signal, comprising: a light wave propagating structure including a series of discrete, interaction members formed of an interaction material having a light propagation characteristic which is altered in response to electromagnetic energy applied thereto, said light propagating structure further including means for propagating said light waves between successive ones of said interaction members at a phase velocity which is less than the phase velocity of said light waves in said interaction material; and means for propagating said electromagnetic modulating signal for applying said signal to said interaction members.

15. A modular structure for modulating a beam of light waves with an electromagnetic modulating signal comprising: means forming a series of spaced interaction zones, each of said zones containing an interaction medium having a light propagation characteristic which changes as a function of electromagnetic energy applied thereto; means for propagating said light waves through said medium at each of said zones in succession; means for applying said electromagnetic signal to said medium at each of said zones in series; and phase correction means operable to substantially equalize the transit times of said light waves and said modulating signal between the beginning of each interaction zone and the beginning of the next successive interaction zone; said phase correction means comprises means operable to decrease the velocity of travel of said light waves between said interaction zones relative to the velocity of said light waves through said interaction medium.

References Cited

UNITED STATES PATENTS

| | | | |
|---|---|---|---|
| 2,995,806 | 8/1961 | Allison | 333—95 X |
| 3,133,198 | 5/1964 | Kaminow. | |
| 3,155,929 | 11/1964 | Birenbaum | 333—95 X |
| 3,289,031 | 11/1966 | Hiramatsu | 333—95 X |

OTHER REFERENCES

Rigrod and Kaminow, "Wide-Band Microwave Light Modulation," Proc. IEEE vol. 51, pp. 137–140, January, 1963.

DAVID SCHONBERG, *Primary Examiner.*

P. R. MILLER, *Assistant Examiner.*